(12) United States Patent
Albrecht et al.

(10) Patent No.: US 9,638,823 B2
(45) Date of Patent: May 2, 2017

(54) METAL SENSOR

(71) Applicant: Robert Bosch GmbH, Stuttgart (DE)

(72) Inventors: Andrej Albrecht, Stuttgart (DE); Tobias Zibold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/364,432

(22) PCT Filed: Oct. 31, 2012

(86) PCT No.: PCT/EP2012/071565
§ 371 (c)(1),
(2) Date: Jun. 11, 2014

(87) PCT Pub. No.: WO2013/087283
PCT Pub. Date: Jun. 20, 2013

(65) Prior Publication Data
US 2014/0340088 A1 Nov. 20, 2014

(30) Foreign Application Priority Data
Dec. 13, 2011 (DE) .................. 10 2011 088 406

(51) Int. Cl.
*G01V 3/08* (2006.01)
*G01V 3/10* (2006.01)
*G01B 7/00* (2006.01)

(52) U.S. Cl.
CPC ............. *G01V 3/104* (2013.01); *G01B 7/003* (2013.01); *G01V 3/107* (2013.01)

(58) Field of Classification Search
CPC ........................................ G01V 3/00–3/108

USPC ................. 324/225, 234, 236–239, 326–329
See application file for complete search history.

(56) References Cited

U.S. PATENT DOCUMENTS

| | | | |
|---|---|---|---|
| 3,823,365 A | | 7/1974 | Anderson |
| 4,053,828 A | * | 10/1977 | Ambler et al. ............... 324/239 |
| 4,255,711 A | * | 3/1981 | Thompson ............. G01V 3/107 324/329 |
| 4,310,799 A | | 1/1982 | Hutchison et al. |
| 4,362,992 A | * | 12/1982 | Young ..................... G01V 3/08 324/247 |
| 4,563,645 A | * | 1/1986 | Kerr ............................. 324/233 |

(Continued)

FOREIGN PATENT DOCUMENTS

| | | |
|---|---|---|
| CN | 1550026 A | 11/2004 |
| CN | 1812094 A | 8/2006 |

(Continued)

OTHER PUBLICATIONS

International Search Report corresponding to PCT Application No. PCT/EP2012/071565 mailed Sep. 17, 2013 (German and English language document) (7 pages).

*Primary Examiner* — Patrick Assouad
*Assistant Examiner* — Demetrius Pretlow
(74) *Attorney, Agent, or Firm* — Maginot, Moore & Beck LLP

(57) ABSTRACT

A metal sensor includes a primary coil arranged in a first plane, a first compensation coil arranged in a second plane, a second compensation coil arranged in a third plane, and a magnetic field sensor arranged in a fourth plane. The first plane, the second plane, the third plane and the fourth plane are oriented parallel to one another and perpendicular to a common z-direction in each case.

12 Claims, 5 Drawing Sheets

(56) References Cited

U.S. PATENT DOCUMENTS

| | | | |
|---|---|---|---|
| 4,891,590 A * | 1/1990 | Hammel | G01D 5/204 318/661 |
| 5,557,206 A * | 9/1996 | Won | 324/329 |
| 5,793,199 A * | 8/1998 | Kasahara | G01N 15/0656 324/204 |
| 6,434,285 B1 * | 8/2002 | Blake | G01R 31/02 250/225 |
| 7,525,308 B2 | 4/2009 | Tsukada et al. | |
| 2006/0164105 A1 * | 7/2006 | Westersten | 324/654 |
| 2008/0012560 A1 * | 1/2008 | Crowley | G01V 3/105 324/300 |
| 2008/0054892 A1 * | 3/2008 | Skultety-Betz | G01V 3/107 324/228 |
| 2008/0074109 A1 | 3/2008 | Tsukada et al. | |
| 2008/0197835 A1 * | 8/2008 | Reime | G01B 7/023 324/200 |
| 2008/0297158 A1 | 12/2008 | Heger et al. | |
| 2009/0021251 A1 * | 1/2009 | Simon | 324/233 |
| 2012/0049850 A1 * | 3/2012 | Reime | 324/329 |
| 2012/0086455 A1 * | 4/2012 | McAdam | G01V 3/107 324/326 |
| 2012/0098667 A1 * | 4/2012 | McAdam | G01V 3/107 340/635 |

FOREIGN PATENT DOCUMENTS

| | | |
|---|---|---|
| CN | 1879186 A | 12/2006 |
| CN | 101103283 A | 1/2008 |
| CN | 101124490 A | 2/2008 |
| CN | 101292176 A | 10/2008 |
| CN | 102183579 A | 9/2011 |
| DE | 199 54 716 A1 | 7/2001 |
| DE | 101 22 741 A1 | 11/2002 |
| DE | 10 2006 053 222 A1 | 5/2008 |
| DE | 10 2010 043 078 A1 | 5/2012 |
| WO | 02/091021 A1 | 11/2002 |

* cited by examiner

METAL SENSOR

This application is a 35 U.S.C. §371 National Stage Application of PCT/EP2012/071565, filed on Oct. 31, 2012, which claims the benefit of priority to Serial No. DE 10 2011 088 406.8, filed on Dec. 13, 2011 in Germany, the disclosures of which are incorporated herein by reference in their entirety.

The disclosure relates to a metal sensor and to a method for operating a metal sensor.

BACKGROUND

Metal sensors for finding metal or other magnetizable objects in walls, floors or in the earth use coils to excite magnetic fields and to measure changes of the magnetic flux. Objects are identified in that the measured flux changes differ depending on whether or not an object is present. The measured flux change is partly a direct consequence of the exciting magnetic field, and partly the consequence of a secondary magnetic field originating from the object. The secondary magnetic field originating from the object is generally a consequence of the exciting magnetic field.

Coil-based metal sensors are known which can estimate a distance of detected objects. Such devices operate in the prior art by the pulse induction method and estimate the distance on the basis of the decay behavior of the measured flux change. This estimation is dependent however on the material properties of the object and on the diameter of the object.

A metal sensor with two coils and a magnetic field sensor is known from the patent application, not yet published on the date of filing, having file reference DE 10 2010 043 078.1. Here, the coils are arranged in such a way that they generate a high magnetic field at the location of an object to be found, however the fields of the individual coils mutually compensate for one another at the location of the magnetic field sensor in the absence of a detectable object. If a detectable object is present, the secondary field originating from the object causes, at the location of the magnetic field sensor, a non-vanishing magnetic field, which can be detected by the magnetic field sensor. A favorable signal/noise ratio is thus produced. It is not possible however to estimate the distance of the object to be detected.

SUMMARY

An object of the present disclosure lies in providing a metal sensor that has been improved further. This object is achieved by a metal sensor as disclosed herein. A further object of the present disclosure is to specify a method for operating the metal sensor. This object is achieved by a method as disclosed herein. A further object of the present disclosure is to provide a measuring device comprising an improved metal sensor. This object is achieved by a measuring device as disclosed herein.

A metal sensor according to the disclosure comprises a primary coil, which is arranged in a first plane, a first compensation coil, which is arranged in a second plane, a second compensation coil, which is arranged in a third plane, and a magnetic field sensor, which is arranged in a fourth plane. Here, the first plane, the second plane, the third plane and the fourth plane are oriented parallel to one another and in each case perpendicularly to a common z-direction. This metal sensor advantageously not only allows a detection of a presence of a metal or magnetizable object, but also an estimation of the distance thereof.

A simple embodiment of the metal sensor is produced if the primary coil, the first compensation coil and the second compensation coil are circular and are arranged coaxially with one another. The magnetic fields generated by the various coils are advantageously then superimposed in a clear and easily controlled manner.

In an embodiment of the metal sensor the third plane is identical to the first plane or the second plane. A compact and simple embodiment of the metal sensor is advantageously produced as a result.

In another embodiment of the metal sensor the fourth plane is identical to the first plane, the second plane or the third plane. This advantageously also enables a compact and simple embodiment of the metal sensor.

In a particularly preferred embodiment of the metal sensor the third plane and the fourth plane are arranged at a first distance of less than 2 mm from one another. Here, the fourth plane is arranged between the first plane and the second plane and is distanced approximately equally as far from the first plane and from the second plane, preferably likewise by less than 2 mm. In addition, the primary coil and the first compensation coil have an approximately identical diameter and an approximately identical number of turns. Here, the diameters differ by no more than 5%. The numbers of turns differ by no more than 10%. Further, a first current can be applied to the primary coil, a second current can be applied to the first compensation coil, and a third current can be applied to the third compensation coil, wherein the first current, the second current and the third current have approximately identical absolute values. Further, the second compensation coil has a number of turns that is a fraction (for example a quarter) of the number of turns of the primary coil. In addition, the second compensation coil has a diameter which differs by a small correction value from the same fraction (for example a quarter) of the diameter of the primary coil. A zero of first order is then advantageously produced for a superimposition of the magnetic fields of the primary coil and of the first compensation coil at the location of the magnetic field sensor, and a zero of second order is then advantageously produced for a superimposition of the magnetic fields of the primary coil and of the compensation coil at the location of the magnetic field sensor. The metal sensor is then advantageously very insensitive to manufacturing tolerances and slightly inaccurate positioning of the components of the metal sensor.

The primary coil and the first compensation coil can preferably be supplied with current in such a way that a first magnetic field is generated which has a quadrupole-like character at a distance, wherein a component of the first magnetic field in the z-direction approximately disappears at the location of the magnetic field sensor if there is no magnetizable object in the vicinity of the metal sensor. The first magnetic field then advantageously has an amplitude dependent on the fourth power of the distance.

It is likewise expedient that the primary coil and the second compensation coil can be supplied with current in such a way that a second magnetic field is generated which has a dipole-like character at a distance, wherein a component of the second magnetic field in the z-direction approximately disappears at the location of the magnetic field sensor if there is no magnetizable object in the vicinity of the metal sensor. The second magnetic field then advantageously has an amplitude dependent on the third power of the distance.

In an embodiment of the metal sensor the primary coil, the first compensation coil and the second compensation coil are connected in series. It is advantageously thus ensured that a coil current of identical strength flows through all coils at any moment in time.

In a development of the metal sensor a push-pull controller for controlling the primary coil, the first compensation coil and/or the second compensation coil is provided. A push-pull controller advantageously has a high dynamic over a large field range and a high signal/noise distance.

A method according to the disclosure for operating a metal sensor of the aforementioned type comprises steps for supplying current to the primary coil and to the first compensation coil during a first time interval and for supplying current to the primary coil and to the second compensation coil during a second time interval. A comparison of the secondary magnetic field originating from the object to be detected during the first time interval and during the second time interval then advantageously allows an estimation of the distance between the object to be detected and the metal sensor.

BRIEF DESCRIPTION OF THE DRAWINGS

The disclosure will now be explained in greater detail with reference to the accompanying figures, in which.

DETAILED DESCRIPTION

Figure 1:
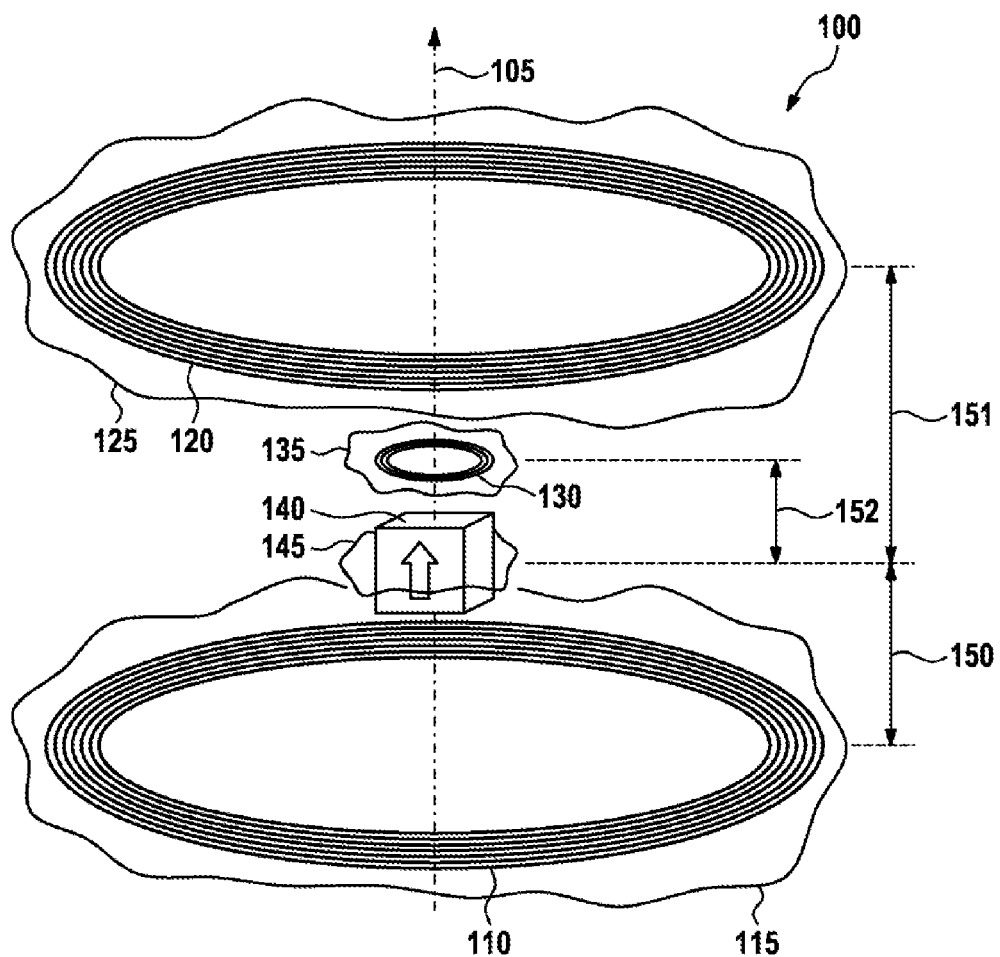
FIG. 1 shows a schematic illustration of a magnetic field sensor.

FIG. 1 shows a schematic illustration of a metal sensor 100. The metal sensor is used to find metal or magnetizable objects in walls, floors or in the earth.

The metal sensor 100 comprises a primary coil 110, a large compensation coil 120, a small compensation coil 130 and a magnetic field sensor 140. The primary coil 110 is arranged in a first plane 115. The large compensation coil 120 is arranged in a second plane 125. The small compensation coil 130 is arranged in a third plane 135. The magnetic field sensor 140 is arranged in a fourth plane 145. The first plane 115, the second plane 125, the third plane 135 and the fourth plane 145 are each oriented parallel to one another and perpendicularly to a common z-direction 105.

In the example illustrated in FIG. 1 the primary coil 110, the large compensation coil 120 and the small compensation coil 130 are formed as planar coils, which are each arranged completely in their respective planes 115, 125, 135. The coils 110, 120, 130 may also have finite heights however in the z-direction 105. In this case the planes 115, 125, 135 correspond to central planes of the respective coils 110, 120, 130 in the z-direction 105. The primary coil 110 is then arranged for example such that a central plane oriented perpendicularly to the z-direction 105 coincides with the first plane 115. The same is true for the large compensation coil 120 and the small compensation coil 130.

In the embodiment illustrated in FIG. 1 the primary coil 110, the large compensation coil 120 and the small compensation coil 130 are each circular and are arranged coaxially with one another. The magnetic field sensor 140 is located on the common axis of symmetry of the coils 110, 120, 130. The primary coil 110, the large compensation coil 120 and the small compensation coil 130 might also not be circular however, for example could be rectangular. In addition, the primary coil 110, the large compensation coil 120 and the small compensation coil 130 may also be arranged in a manner other than coaxially.

The magnetic field sensor 140 may be a Hall sensor, an AMR sensor or a GMR sensor, or a SQUID sensor, for example. The magnetic field sensor 140 is oriented such that it can detect, with high accuracy, magnetic fields oriented in particular in the z-direction 105.

The first plane 115 and the fourth plane 145 are arranged at a first distance 150 from one another. The second plane 125 and the fourth plane 145 are arranged at a second distance 151 from one another. The third plane 135 and the fourth plane 145 are arranged at a third distance 152 from one another. The distances between two adjacent planes 115, 125, 135, 145 are preferably less than 2 mm in each case. The primary coil 110 has a diameter D and a number of turns W. The large compensation coil 120 has a diameter D' and a number of turns W'. The small compensation coil 130 has a diameter d and a number of turns w. The coil diameters D, D', d may be a few centimeters in each case. The number of turns W, W', w may typically be a few tens of turns to a few hundreds of turns.

An alternating current with a frequency in a range between, for example, a few 100 Hz and few 100 kHz can be applied to each of the coils 110, 120, 130. Here, the alternating current may have a sinusoidal, rectangular or triangular profile for example. Here, each of the coils 110, 120, 130 generates a magnetic alternating field with a dipole-like character in leading multipole order. If two of the three coils 110, 120, 130 are supplied with current simultaneously, the respective magnetic fields are thus superimposed. Here, the coils 110, 120, 130 are expediently supplied with alternating currents of the same frequency, the same current profile and the same phase.

Current is supplied to the large compensation coil 120 and to the small compensation coil 130 such that the magnetic fields generated thereby are each directed opposite to the magnetic field generated by the primary coil 110. This is the case for example if the large compensation coil 120 and the small compensation coil 130 each has a winding direction which is opposite the winding direction of the primary coil 110. Alternatively, the large compensation coil 120 and the small compensation coil 130 are supplied with a current of reverse sign compared with the primary coil 110.

The position of the planes 115, 124, 135, 145, the distances therebetween 150, 151, 152, the coil diameters D, D' and d, the number of turns W, W', w of the coils 110, 120, 130, and the amplitudes of the currents flowing through the coils 110, 120, 130 are selected such that, during operation of the primary coil 110 and of the large compensation coil 120 or of the primary coil 110 and the small compensation coil 130, an overall magnetic field is produced in each case, of which the magnetic field component in the z-direction 105 disappears at the location of the magnetic field sensor 140 if there is no magnetizable object in the vicinity of the metal sensor 100. This can be achieved particularly easily if the currents (I, I', I") flowing through the coils 110, 120, 130 have identical absolute values, since a connection in series of the coils 110, 120, 130 is then possible (I, I', I").

The aforementioned parameters are further determined such that, during operation of the primary coil 110 and the large compensation coil 120, the magnetic fields produced are superimposed such that the overall magnetic field has a quadrupole-like character at a distance. The parameters are additionally fixed such that, during operation of the primary coil 110 and the small component coil 130, the generated magnetic fields are superimposed to form an overall magnetic field which has a dipole-like character at a distance. These overall magnetic fields are then referred to as a primary field in each case. The amplitude of the dipole field (of the dipole-like primary field) decreases with the third power of the distance. The amplitude of the quadrupole field (of the quadrupole-like primary field) decreases with the fourth power of the distance.

The amplitude of the secondary field, which originates from an object to be detected and is excited by the primary field, is dependent on the amplitude of the primary field at the location of the object, but not on properties of the object to be detected. As a result, a quotient formed from the secondary field amplitude with excitation by the dipole field and formed from the secondary field amplitude with excitation by the quadrupole field is proportional to the distance between the object to be detected and the metal sensor 100. The distance of the object to be detected can thus be concluded from a measurement of this quotient.

The above-mentioned coil parameters can be selected for example such that the third plane 135 is identical to the first plane 115 or to the second plane 125. In addition, the fourth plane 145 may be identical to the first plane 115, the second plane 125 or the third plane 135.

A particularly favorable parameter selection is provided however if the third distance 152 between the third plane 135 and the fourth plane 145 is small (preferably less than 2 mm), but is not equal to zero, the first distance 150 and the second distance 151 are approximately of identical size (preferably likewise smaller than 2 mm), the diameter D of the primary coil 110 corresponds to the diameter D' of the large compensation coil 120, the number of turns W of the primary coil 110 is identical to the number of turns W' of the large compensation coil 120, the number of turns w of the small compensation coil 130 is a fraction (for example a quarter) of the number of turns W of the primary coil 110, and the diameter d of the small compensation coil 130 differs from the same fraction (for example a quarter) of the diameter D of the primary coil 110 by a small correction value, which can be easily determined numerically. Here, a coil current of identical amplitude is supplied to all coils 110, 120, 130. The diameter D of the primary coil 110 and the diameter D' of the large compensation coil 120 should preferably differ from one another by no more than 5%. The number of turns W of the primary coil 110 should preferably differ by no more than 10% from the number of turns W' of the large compensation coil 120.

Figure 2:
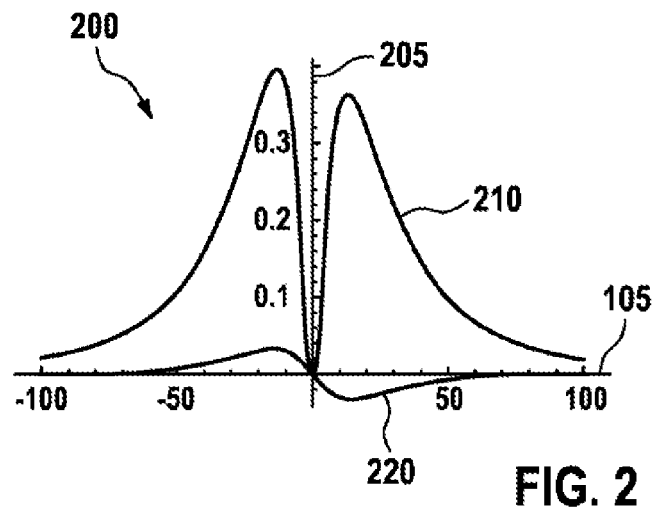
FIG. 2 shows a location dependence on magnetic fields generated by the metal sensor.

FIG. 2 shows a field profile graph 200 of magnetic fields produced with the specified parameter selection. The z-direction 105 is plotted in random units on a horizontal axis. A z-component 205 of the magnetic field produced is illustrated in arbitrary units on a vertical axis. A first curve shows the profile of the dipole field 210 which is produced if current is supplied to the primary coil 110 and the small compensation coil 130, whereas no current is supplied to the large compensation coil 120. A second curve shows the profile of the quadrupole field 220 which is produced if current is supplied to the primary coil 110 and the large compensation coil 120, whereas no current is supplied to the small compensation coil 130.

Figure 3:
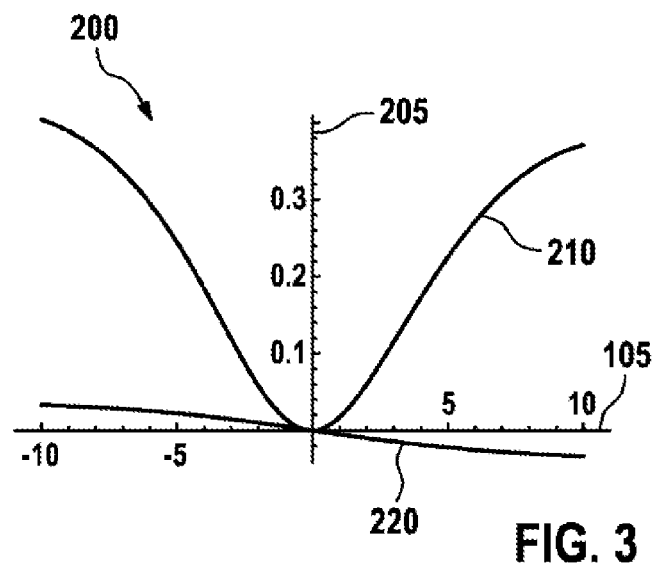
FIG. 3 shows an enlargement of the magnetic field profile at the location of a magnetic field sensor.

FIG. 3 shows an enlargement of the field profile graph 200 in the region around the location of the magnetic field sensor 140, which is located at the origin in the z-direction 105. It can be seen that both magnetic fields 210, 220 disappear at the location of the magnetic field sensor 140. The dipole field 210 even has a zero point of second order (that is to say a zero of the first derivative), which is particularly favorable in respect of the tolerance of the metal sensor 100 to inaccurate positioning.

Figure 4:
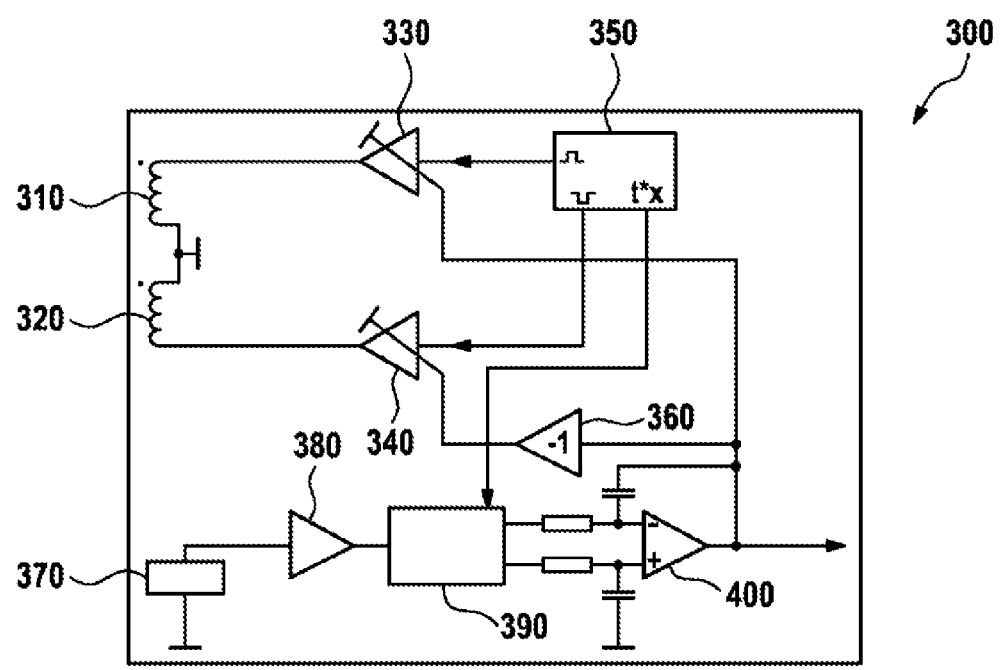
FIG. 4 shows a schematic block diagram of a push-pull controller.

The metal sensor 100 can be combined effectively with a push-pull controller in order to excite the coils 110, 120, 130 and to read out the magnetic field sensor 140. FIG. 4 shows a schematic block diagram of a push-pull controller 300. The push-pull controller 300 has a first controllable amplifier 330 and a second controllable amplifier 340. The first controllable amplifier 330 serves to supply current to a first coil 310, which for example may be the primary coil 110. The second controllable amplifier 340 serves to supply current to a second coil 320, which for example may be the large compensation coil 120 or the small compensation coil 130. The push-pull controller 300 additionally comprises a signal source 350, which supplies the two controllable amplifiers 330, 340 with periodically changing currents which are phase-shifted by 180°.

A sensor 370 of the push-pull controller 300 may be the magnetic field sensor 140, for example. A signal measured by the sensor 370 can be amplified via an optional amplifier 380 before it is fed to a synchronous demodulator 390, which also receives frequency information from the signal source 350 and demodulates the signal supplied by the sensor 370. The signal supplied by the synchronous demodulator 390 is fed to an integrating comparator 400, which controls the amplitudes of the coil currents output by the controllable amplifiers 330, 340, such that the magnetic field disappears at the location of the magnetic field sensor 140, even with the presence of a magnetizable object. The resultant control value differs with the presence of a magnetizable object from the control value with the absence of a magnetizable object and can be used to identify the presence of the magnetizable object.

To summarize, the primary coil 110 and the large compensation coil 120 or the primary coil 110 and the small compensation coil 130 are thus always supplied with current alternately. The magnetic field produced in each case at the location of the magnetic field sensor 140 is detected and allows the identification of the presence of a magnetizable object in the vicinity of the metal sensor 100 and also a determination of the distance between the magnetizable object and the metal sensor 100.

Figure 6:
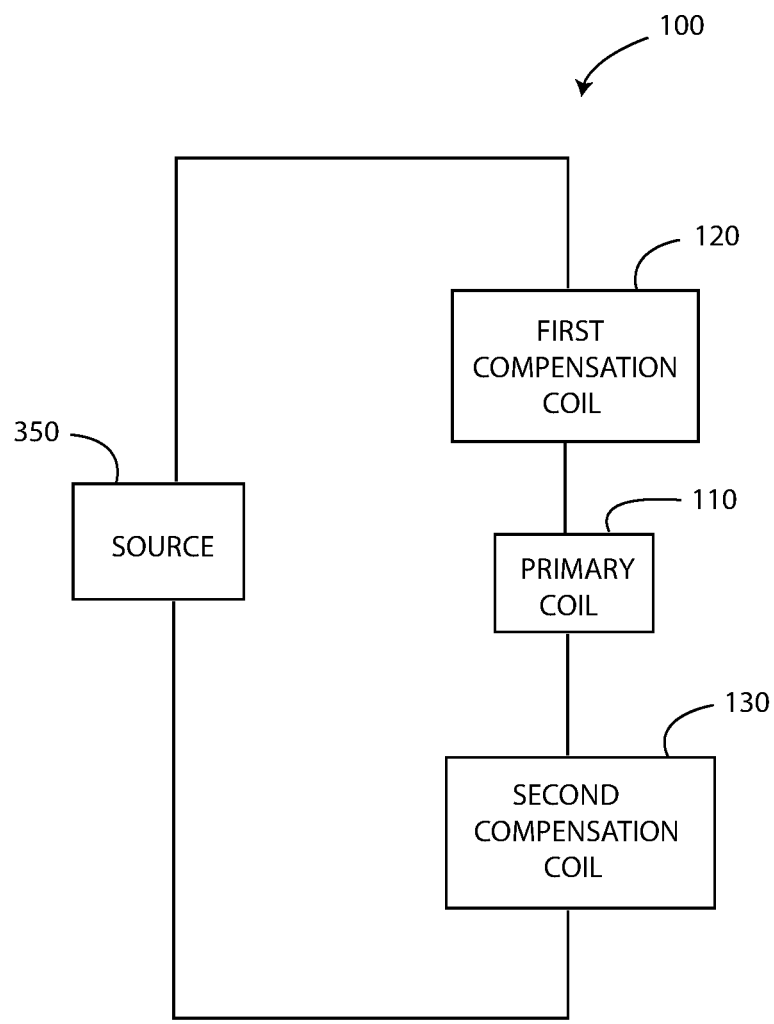
FIG. 6 shows a metal sensor in which the primary coil, the first compensation coil, and the second compensation coil are connected in series.

With a suitable arrangement of the coils 110, 120, 130 and suitable selection of the numbers of turns, the winding direction and the diameter, it is possible to electrically connect the coils 110, 120, 130 in series, as shown in FIG. 6. The same electric current then always flows through the coils, whereby changes to this current, caused by ambient influences, do not affect the field compensation at the location of the magnetic field sensor 140.

The use of periodic excitation fields is advantageous since the proportion of the received signal caused by the object to be detected can then be separated very effectively from interferences and from noise due to its frequency. This can be achieved for example by means of the push-pull controller 300.

The coils 110, 120, 130 can be manufactured as print coils. In this case, the secondary fields generated by the object to be detected are very small, which is why AMR or GMR sensors in particular are suitable as a magnetic field sensor 140 in this case.

In more complex embodiments of the metal sensor 100, further transmitting coils and also further magnetic field sensors can be provided. This may allow an imaging representation or an identification of lateral object positions and object orientations, and may allow triangulation. Higher multipole orders can likewise be used, but have a low spatial range.

Figure 5:
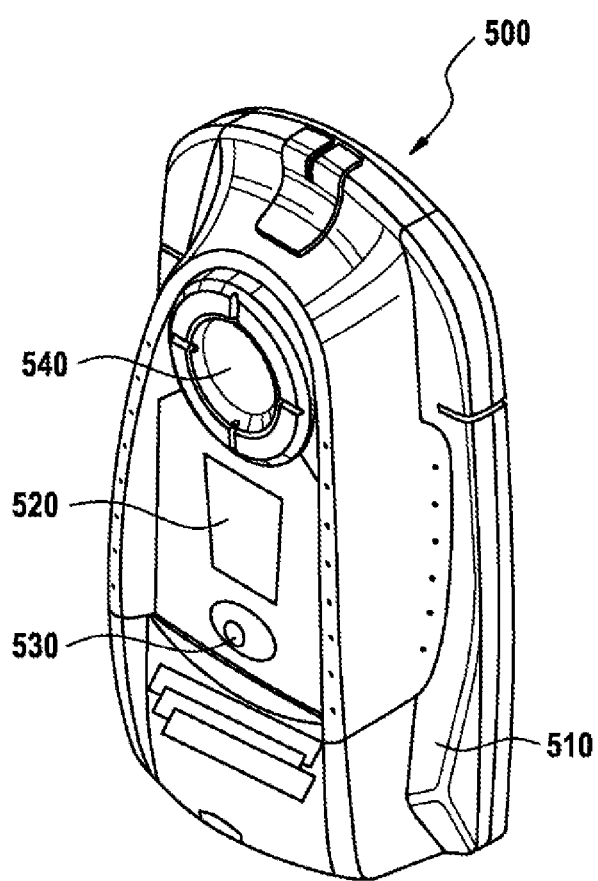
FIG. 5 shows a view of a measuring device.

FIG. 5 shows a perspective illustration of a measuring device 500 which comprises a metal sensor 100 of the aforementioned type. The measuring device 500 is formed as a hand-held measuring device and is used for detection of objects encased in a medium. For example the measuring device 500 can be used to find metal or magnetizable objects in walls, floors or in the earth.

The measuring device 500 has a housing 510. The metal sensor 100 is arranged within the housing 510. The housing 510 has display device 520, which can be used to indicate the presence of a detected object to a user of the measuring device 500. The display device 520 may be a screen or a light-emitting diode for example. The measuring device 500 additionally has an operating element 530, by means of which a user of the measuring device 500 can switch the measuring device 500 on, off and over. Further, the housing 510 of the measuring device 500 has a marking aid 540, which is formed as an aperture running through the measuring device 500. If the measuring device 500 is guided along a wall for example by a user and the measuring device 500 detects a presence of an object located in the wall, the user of the measuring device 500 can thus mark the position of the detected object through the aperture of the marking aid 540.

The invention claimed is:

1. A metal sensor comprising:
a primary coil, which is arranged in a first plane;
a first compensation coil, which is arranged in a second plane;
a second compensation coil, which is arranged in a third plane;
a magnetic field sensor, which is arranged in a fourth plane; and
a signal source electrically connected to the primary coil, the first compensation coil, and the second compensation coil, and configured to supply the primary coil, the first compensation coil, and the second compensation coil with current,
wherein the first plane, the second plane, the third plane and the fourth plane are oriented parallel to one another and in each case perpendicularly to a common z-direction,
wherein the signal source supplies current to the primary coil and to the first compensation coil to generate a magnetic field defining a first shape,
wherein the signal source supplies current to the primary coil and to the second compensation to generate a magnetic field defining a second shape, and
wherein the first shape is different from the second shape.

2. The metal sensor as claimed in claim 1, wherein the primary coil, the first compensation coil and the second compensation coil are circular and are arranged coaxially with one another.

3. The metal sensor as claimed in claim 1, wherein the third plane is identical to the first plane or the second plane.

4. The metal sensor as claimed in claim 1, wherein the fourth plane is identical to the first plane, the second plane or the third plane.

5. The metal sensor as claimed in claim 1, wherein:
the third plane and the fourth are arranged at a first distance of less than 2 mm from one another,
the fourth plane is arranged between the first plane and the second plane and is distanced approximately equally far from the first plane and from the second plane,
the primary coil and the first compensation coil have diameters which differ by no more than 5%,
the primary coil and the first compensation coil have numbers of turns which differ by no more than 10%,
a first current is applied to the primary coil and a second current is applied to the first compensation coil, and a third current is applied to the second compensation coil,
the first current, the second current and the third current have approximately identical absolute values,
the second compensation coil has a number of turns that is a fraction of the number of turns of the primary coil, and
the second compensation coil has a diameter which differs by a small correction value from the same fraction of the diameter of the primary coil.

6. The metal sensor as claimed in claim 1, wherein:
the magnetic field defining the first shape is a substantially quadrupolar magnetic field at a distance, and
a component of the quadrupolar magnetic field in the z-direction approximately disappears at a location of the magnetic field sensor if there is no magnetizable object in a vicinity of the metal sensor.

7. The metal sensor as claimed in claim 6, wherein:
the magnetic field defining the second shape is a substantially dipolar magnetic field at a distance, and
a component of the dipolar magnetic field in the z-direction approximately disappears at the location of the magnetic field sensor if there is no magnetizable object in the vicinity of the metal sensor.

8. The metal sensor as claimed in claim 1, wherein the primary coil, the first compensation coil and the second compensation coil are connected in series.

9. The metal sensor as claimed in claim 1, further comprising:
a push-pull controller configured to control the primary coil, the first compensation coil and/or the second compensation coil, the push-pull controller including the signal source.

10. A method for operating a metal sensor including a primary coil, a first compensation coil, a second compensation coil, and a magnetic field sensor, the method comprising:
supplying current to the primary coil and to the first compensation coil during a first interval; and
supplying current to the primary coil and to the second compensation coil during a second interval,
wherein the primary coil is arranged in a first plane,
wherein the first compensation coil is arranged in a second plane,
wherein the second compensation coil is arranged in a third plane,
wherein the magnetic field sensor is arranged in a fourth plane, and
wherein the first plane, the second plane, the third plane and the fourth plane are oriented parallel to one another and in each case perpendicularly to a common z-direction.

11. A measuring device, comprising:
at least one metal sensor including (i) a primary coil, which is arranged in a first plane, (ii) a first compensation coil, which is arranged in a second plane, (iii) a second compensation coil, which is arranged in a third plane, (iv) a magnetic field sensor, which is arranged in a fourth plane, and (v) a signal source electrically connected to the primary coil, the first compensation coil, and the second compensation coil, and configured to supply the primary coil, the first compensation coil, and the second compensation coil with current, wherein the first plane, the second plane, the third plane and the fourth plane are oriented parallel to one another and in each case perpendicularly to a common z-direction, wherein the signal source supplies current to the primary coil and to the first compensation coil to generate a magnetic field defining a first shape, wherein the signal source supplies current to the primary coil and to the second compensation to generate a magnetic field defining a second shape, and wherein the first shape is different from the second shape.

12. The measuring device as claimed in claim 11, wherein:

the magnetic field defining the first shape is a substantially quadrupolar magnetic field at a distance, and the magnetic field defining the second shape is a substantially dipolar magnetic field at a distance.

* * * * *